United States Patent [19]

Krumpelt et al.

[11] Patent Number: 5,929,286
[45] Date of Patent: Jul. 27, 1999

[54] METHOD FOR MAKING HYDROGEN RICH GAS FROM HYDROCARBON FUEL

[75] Inventors: Michael Krumpelt, Naperville; Shabbir Ahmed, Bolingbrook; Romesh Kumar, Naperville; Rajiv Doshi, Downers Grove, all of Ill.

[73] Assignee: The University of Chicago, Chicago, Ill.

[21] Appl. No.: 09/092,190

[22] Filed: Jun. 5, 1998

Related U.S. Application Data

[62] Division of application No. 08/867,556, Jun. 2, 1997.

[51] Int. Cl.$^6$ .................................................. C07C 45/51

[52] U.S. Cl. .......................... 568/383; 568/449; 549/512; 252/376; 423/656

[58] Field of Search ..................................... 568/383, 449; 423/656, 655; 252/373, 376; 549/512

[56] References Cited

U.S. PATENT DOCUMENTS

| | | | |
|---|---|---|---|
| 3,997,477 | 12/1976 | Takeuchi | 252/465 |
| 4,088,608 | 5/1978 | Tanaka et al. | 252/466 PT |

*Primary Examiner*—Gary Geist
*Assistant Examiner*—Sreeni Padmanabhan
*Attorney, Agent, or Firm*—Emrich & Dithmar

[57] ABSTRACT

A method of forming a hydrogen rich gas from a source of hydrocarbon fuel in which the hydrocarbon fuel contacts a two-part catalyst comprising a dehydrogenation portion and an oxide-ion conducting portion at a temperature not less than about 400° C. for a time sufficient to generate the hydrogen rich gas while maintaining CO content less than about 5 volume percent. There is also disclosed a method of forming partially oxidized hydrocarbons from ethanes in which ethane gas contacts a two-part catalyst comprising a dehydrogenation portion and an oxide-ion conducting portion for a time and at a temperature sufficient to form an oxide.

10 Claims, 4 Drawing Sheets

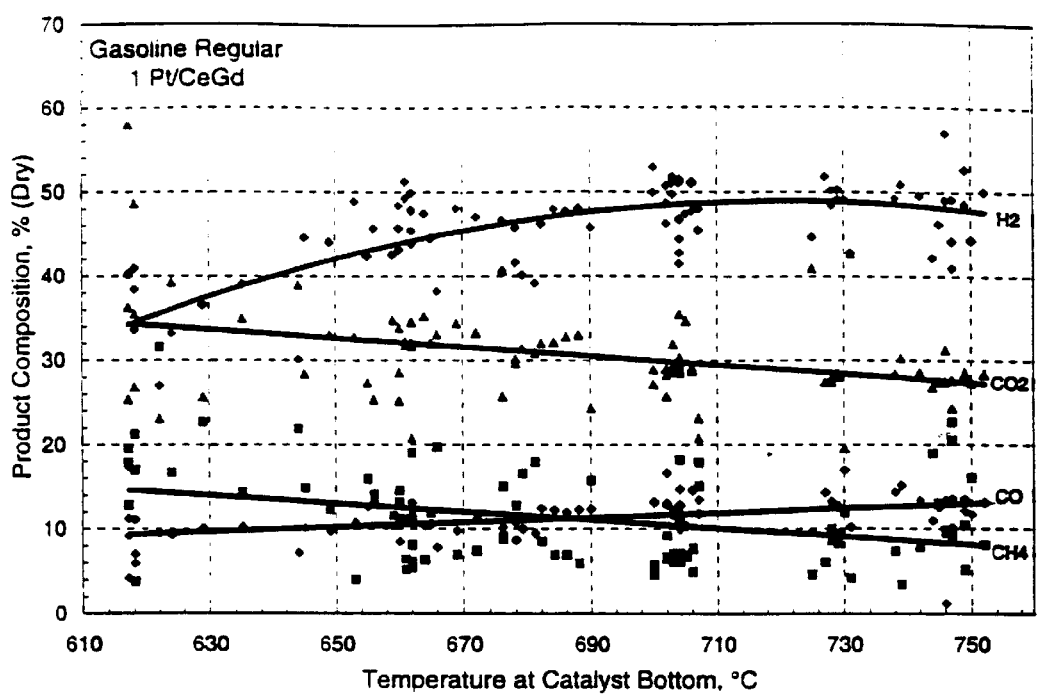
Figure 1. (3/31/97)

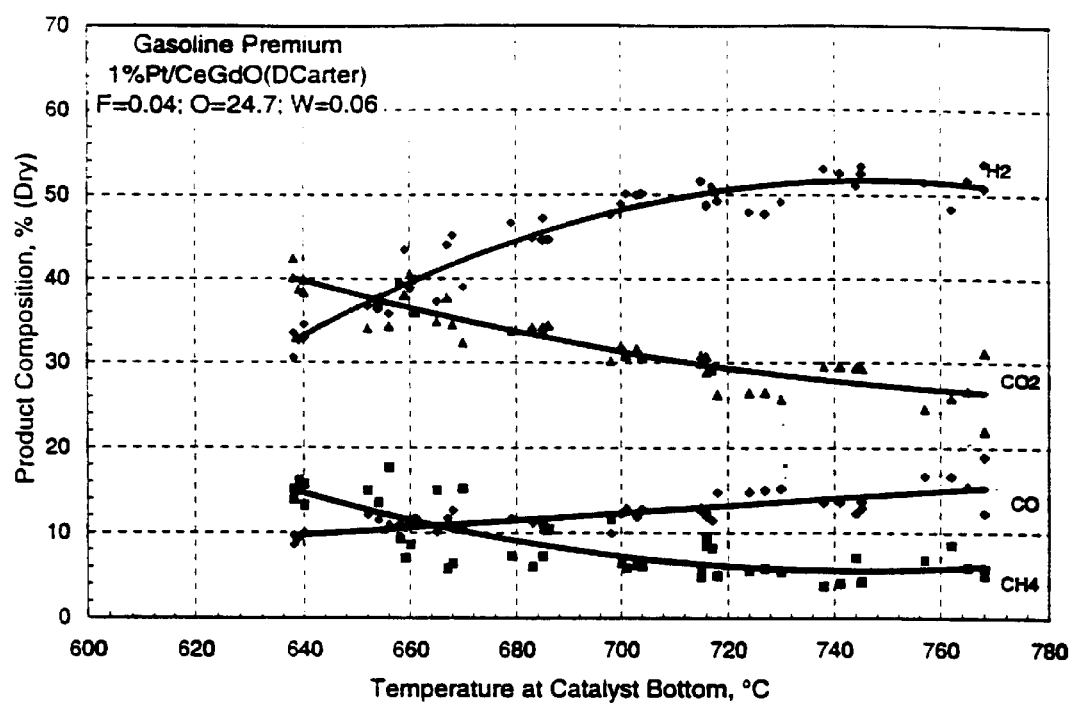
Figure. 2. (4/11/97)

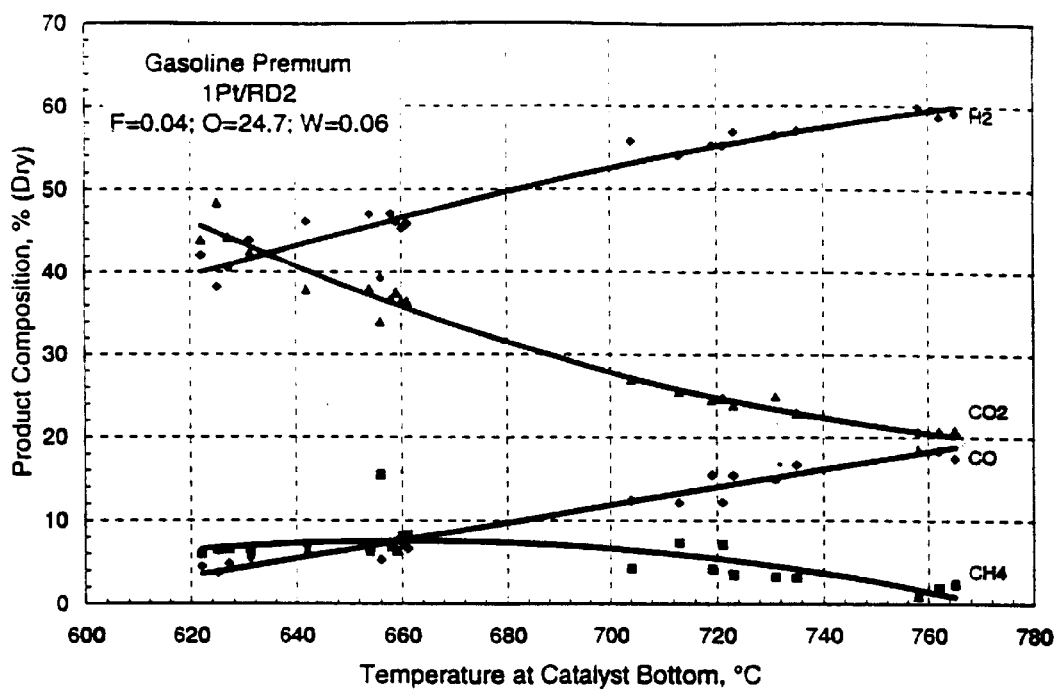
Figure 3. (4/23/97)

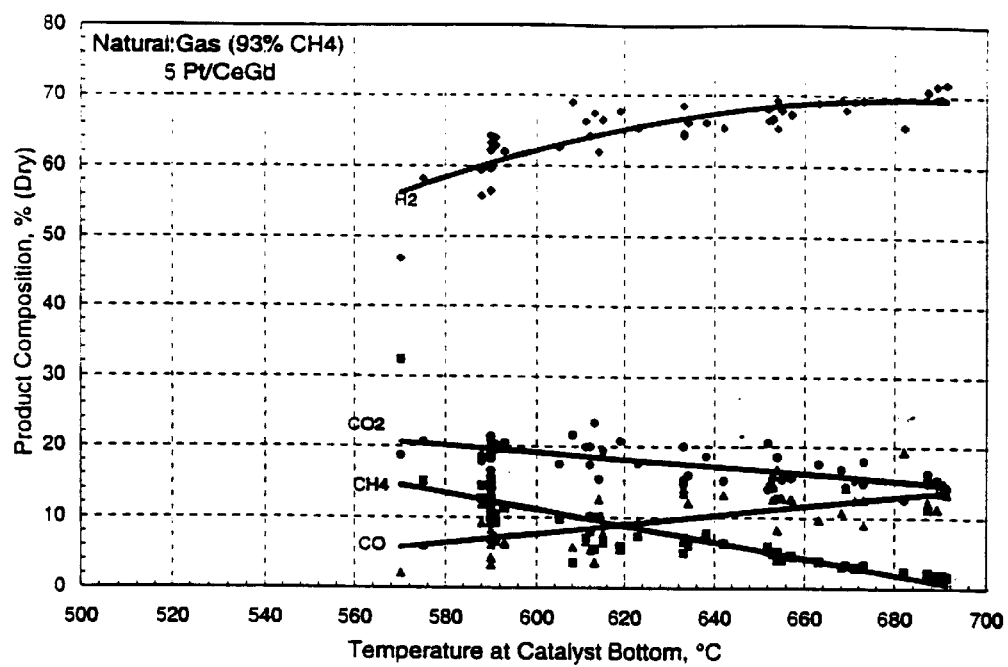
Figure 4. (3/3/97)

METHOD FOR MAKING HYDROGEN RICH GAS FROM HYDROCARBON FUEL

This is a divisional of application Ser. No. 08/867,556 filed Jun. 2, 1997.

CONTRACTUAL ORIGIN OF THE INVENTION

The United States Government has rights in this invention pursuant to Contract No. W-31-109-ENG-38 between the U.S. Department of Energy (DOE)and The University of Chicago representing Argonne National Laboratory.

BACKGROUND OF THE INVENTION

Fuel cell-powered vehicles are being developed by the domestic and foreign automotive industry as a more fuel efficient and less polluting alternative to the current internal combustion engines. Since the fuel cells operate preferably on hydrogen, but storing of hydrogen on-board a vehicle is not as convenient as carrying liquid hydrocarbon fuel in a tank, a "fuel processor" must generate the hydrogen.

Converting hydrocarbon fuels to hydrogen can be done by steam reforming (reaction of the hydrocarbon with steam) or by partial oxidation (reaction with a substoichiometric amount of air). Steam reforming reactors are fairly bulky and are heat-transfer limited. Partial oxidation is more rapid but less developed. See U.S. Pat. No. 5,248,566 issued Sep. 28, 1993 to Kumar et al., the disclosure of which is incorporated by reference, for a general discussion of the use of a fuel cell in a vehicle.

It is highly desirable to provide a catalyst for the partial oxidation reaction so that the temperature, can be lowered from the 1000° C. temperatures required for steam reformers. At lower temperatures, the reactors can be smaller, and the product gas contains higher concentrations of hydrogen and less carbon monoxide, which is desirable. However, an appropriate catalyst has heretofore not been available. This invention relates to a new family of catalysts that are effective for the conversion of a wide range of hydrocarbons, including aliphatic hydrocarbons to hydrogen.

SUMMARY OF THE INVENTION

This invention relates to a partial oxidation catalyst. More specifically, this invention relates to a catalyst for partially oxidizing hydrocarbon fuels such as gasoline to produce a high percentage yield of hydrogen suitable for supplying a fuel cell. The difficulty of converting hydrocarbons (e.g. n-octane, iso-octane, etc.), a main component of gasoline, to hydrogen is the fact that the hydrogen/oxygen bond is thermodynamically stronger than the carbon oxygen bond at moderate temperatures. Under thermal equilibrium conditions, the reaction products will therefore be rich in water and poor in hydrogen. In order to produce a hydrogen-rich gas, a bifunctional catalyst is required which can "dehydrogenate" the hydrocarbon molecule, and then selectively oxidize the carbon chain.

In one aspect of the invention, the catalyst is a cermet containing ceria as the oxide ion conduction material, and platinum as the hydrogen dissolving material. The catalyst can be prepared from a high surface area powder of doped ceria ($Ce_{0.8}Gd_{0.2}O_{1.9}$) and a second phase powder which could be either a metal like platinum or an oxide like $Co_2O_3$ which is reduced in-situ in the reactor to cobalt metal. Other metals include all noble and transition metals. Other oxide ion conducting materials such as zirconia, bismuth oxides or vanadates, lanthanum gallate, perovskite containing manganese, iron, cobalt, or others forming oxygen deficient structures are applicable.

In another aspect of the invention, various alkanes can be oxidized by contact with the catalyst of the present invention to form alkene oxides, ketones or aldehydes.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

FIG. 1 is a graph depicting the relationship between temperature and product gas composition for regular gasoline and a catalyst of Pt/CeGdO.

FIG. 2 is a graph depicting the relationship between temperature and product gas composition for premium gasoline and a catalyst of Pt/CeGdO.

FIG. 3 is a graph depicting the relationship between temperature and product gas composition for premium gasoline and a catalyst of Pt/CeSmLiO.

FIG. 4 is a graph depicting the relationship between temperature and product gas composition for natural gas and a catalyst of Pt/CeGdO.

DETAILED DESCRIPTION OF THE INVENTION

The difficulty of converting hydrocarbons such as n-octane (the main component of gasoline) to hydrogen is the fact that the hydrogen/oxygen bond is thermodynamically stronger than the carbon oxygen bond at moderate temperatures. Under thermal equilibrium conditions, the reaction product will therefore be rich in water and poor in hydrogen. We discovered that in order to get a hydrogen-rich gas one would have to find a catalyst that can "dyhydrogenate" the hydrocarbon molecule, and then selectively oxidize the carbon chain. Thus, the catalyst must be bifunctional.

To dehydrogenate a hydrocarbon molecule, one can use metals that dissolve hydrogen such as platinum, nickel or any Group VIII metal. Ni is the least preferred because an oxidation product thereof, $NiO_4$, is poisonous. To selectively oxidize the carbon chain, we found that one is able to use a source of ionic oxygen. Ionic oxygen apparently reacts with the double bonds of a dehydrogenated hydrocarbon to form oxygen carbon bonds. Sources of ionic oxygen are oxides crystallizing in the fluorite or perovskite structure, such as for instance by way of example without limitation, $ZrO_2$, $CeO_2$, $Bi_2O_3$, $BiVO_4$, $LaGaO_3$. By combining such oxides with a hydrogen dissolving metal and passing a hydrocarbon/air mixture over it, we discovered it is possible to obtain hydrogen-rich gas from an aliphatic as well as aromatic hydrocarbons.

We chose for purposes of examples, only, ceria as the oxide ion conducting material, and platinum as the hydrogen dissolving metal. A cermet containing the catalysts were prepared by a solid state method. The starting powders were a high surface area (about 32 $m^2/gm$) doped ceria ($Ce_{0.8}Gd_{0.2}O_{1.9}$) and a second phase. The starting second phase powder was either a metal like Pt or an oxide like $Co_2O_3$ which is reduced in-situ in the reactor to cobalt metal.

The two powders were mixed in the desired ratios of 1% Pt metal and 99% ceramic along with some isopropyl alcohol and up to 5 wt% of a dispersing agent for the second phase (oleic acid for metals and Hypermer Kd2 from ICI Americas Inc. for oxides) and then milled vigorously in a high density polyethylene bottle with Tosoh milling media. The mixture was then dried to remove the alcohol while stirring on a hot plate to about 70° C., pressed into 1.125–1.5"pellets with about 3 gms of powder using 10,000 to 12,000 lbs. load and fired at 1000° C. for 15–60 mins. in air. The resulting pellet had a uniform pore structure to allow gas access.

Such catalysts were tested in a reactor with feed streams of a hydrocarbon fuel ($C_nH_m$), water and oxygen. The liquid fuel and liquid water were vaporized in a heated coil under a temperature bath maintained at 130–140° C. Oxygen was mixed in with the vapors and the reactant mixture was then fed into the reactor tube. The three feeds were mixed such that the (oxygen/fuel) molar ratio was less than or equal to n/2, while the water/fuel (molar) ratio was greater than or equal to n. The feed rates were adjusted to obtain a residence time of between 0.1–2 second in contact with the catalysts.

The catalysts particles were packed inside the reactor, typically weighing 1.5–2.5 g and occupying 1–3 cm$^3$ of space. The reactor tube was kept in an electrically heated furnace and maintained at the desired temperature (200–700° C.). Thermocouples located above and below the catalyst measured the temperature at the catalyst bed inlet and outlet, respectively.

Referring to FIG. 1, there is reported the results of tests using a Pt/CeGdO two part catalyst with regular gasoline. FIG. 2 shows the results of tests using a Pt/Ce GdO two part catalyst with premium gasoline. FIG. 3 shows the results of tests using a Pt/Ce Sm LiO two part catalyst with premium gasoline and FIG. 4 shows the results of Pt/CeGdO two part catalyst on natural gas.

In general, any Group VIII metal (or mixtures thereof) may be used in combination with an oxide-ion conducting ceramic crystallizing in the fluorite or perovskite structure. The oxide may be doped with a suitable rare earth, such as Gd or Sm or additionally with a suitable alkali or alkaline earth metal, such as Li or Na In general, the reaction, which is exothermic, should be conducted in the range of from about 400° C. to about 900° C. and preferably from about 500° C. to about 750° C. The lower the temperature while maintaining high $H_2$ concentration and low CO concentration, the better. It is important to obtain as high a concentration of hydrogen as possible, but one limiting aspect is the amount of CO found, which should preferably not exceed 5% by volume.

In another aspect of the invention, various alkanes, such as ethane, can be contacted with the inventive catalysts to form various oxides, such as ethylene oxide, ketones and aldehydes. The reaction has to be at a temperature and for a time sufficient to form the desired products, all parameters of time and temperature are within the skill of art.

While there has been disclosed what is considered to be the preferred embodiment of the present invention, it is understood that various changes in the details may be made without departing from the spirit, or sacrificing any of the advantages of the present invention.

The embodiments of the invention in which an exclusive property or privilege is claimed are defined as follows:

1. A method of forming a hydrogen rich gas from a source of hydrocarbon fuel, comprising contacting the hydrocarbon fuel with a two-part catalyst comprising a dehydrogenation portion and an oxide-ion conducting portion at a temperature not less than about 400° C. for a time sufficient to generate the hydrogen rich gas while maintaining the CO content less than about 5 volume percent.

2. The method of claim 1, wherein the hydrocarbon fuel is natural gas.

3. The method of claim 1, wherein the hydrocarbon fuel is gasoline.

4. The method of claim 1, wherein the hydrocarbon fuel includes alkanes.

5. The method of claim 4, wherein the hydrocarbon fuel also includes aromatics.

6. The method of claim 5, wherein the hydrocarbon fuel includes branched alkanes and alkenes.

7. The method of claim 2, wherein the dehydrogenation portion includes a group VIII metal, and the oxide-ion conducting portion is selected from a ceramic oxide from the group crystallizing in the fluorite structure or $LaGaO_3$ and mixtures thereof.

8. A method of forming partially oxidized hydrocarbon fuel gas comprising contacting hydrocarbon fuel gas with a two-part catalyst comprising a dehydrogenation portion and an oxide-ion conducting portion to form an oxide.

9. The method of claim 8, wherein the hydrocarbon fuel gas is ethane and the product is ethylene oxide.

10. The method of claim 8, wherein the hydrocarbon fuel gas is an alkane and the product is a ketone or aldehyde or mixtures thereof.

* * * * *